(12) United States Patent
Roy et al.

(10) Patent No.: US 7,988,078 B1
(45) Date of Patent: Aug. 2, 2011

(54) GLASS-BREAKER MECHANISM

(76) Inventors: Julien Edwin Roy, Lafayette, LA (US); Douglas Clifton Cruthirds, Biloxi, MS (US)

( * ) Notice: Subject to any disclaimer, the term of this patent is extended or adjusted under 35 U.S.C. 154(b) by 0 days.

(21) Appl. No.: 12/904,845

(22) Filed: Oct. 14, 2010

Related U.S. Application Data

(60) Provisional application No. 61/396,421, filed on May 27, 2010.

(51) Int. Cl.
   *B02C 23/00* (2006.01)
(52) U.S. Cl. ............................................. 241/33; 241/99
(58) Field of Classification Search .................... 241/33, 241/36, 99
   See application file for complete search history.

(56) References Cited

U.S. PATENT DOCUMENTS

| | | | |
|---|---|---|---|
| 4,024,440 A * | 5/1977 | Miller | 361/251 |
| 4,768,128 A * | 8/1988 | Jankowiak et al. | 361/251 |
| 5,097,599 A | 3/1992 | Hasegawa | |
| 5,791,056 A | 8/1998 | Messina | |
| 5,952,916 A | 9/1999 | Yamabe | |
| 6,666,566 B1 | 12/2003 | Uke | |
| 6,766,933 B1 | 7/2004 | Wang | |
| 7,028,874 B2 | 4/2006 | Lin | |
| D577,562 S | 9/2008 | Lin et al. | |
| 2003/0089755 A1 | 5/2003 | Peers-Smith et al. | |
| 2003/0136009 A1 | 7/2003 | McNeill | |

\* cited by examiner

*Primary Examiner* — Faye Francis
(74) *Attorney, Agent, or Firm* — Richard C. Litman

(57) ABSTRACT

The glass-breaker mechanism includes a sensor component and a glass-breaker component. The sensor component is installed at a low point within the driver door of a vehicle. The sensor component contains a water-soluble material that retains a spring in its compressed state so long as the water-soluble material is dry. If the vehicle is immersed in water, the water-soluble material dissolves, releasing the spring. The spring drives a pin into the end of a pressurized gas (e.g., $CO_2$) cartridge, releasing the gas therein. The gas passes through a tube to the glass-breaker component installed upon the glass just below the top of the door to drive a spiked piston into the glass and shatter the tempered safety glass of the window.

18 Claims, 4 Drawing Sheets

GLASS-BREAKER MECHANISM

CROSS-REFERENCE TO RELATED APPLICATION

This application claims the benefit of U.S. Provisional Patent Application Ser. No. 61/396,421, filed May 27, 2010.

BACKGROUND OF THE INVENTION

1. Field of the Invention

The present invention relates generally to emergency escape devices and systems, and more particularly to a glass-breaker mechanism that will automatically break a glass panel, e.g., in a motor vehicle, when the water level exceeds a predetermined level to provide an escape route during flooding or submerged conditions.

2. Description of the Related Art

A number of tragic accidents have occurred over the years when motor vehicles have ended up at least partially submerged in a body of water. Such a situation may be due to the failure of a parking brake, a collision, loss of control of the vehicle, or flooding during hurricane conditions, among various potential causes. In many instances the vehicle is relatively undamaged and the occupants may be physically capable of escape, but the vehicle doors may be jammed or unable to be opened due to water pressure. More and more motor vehicles are now equipped with electrically operated windows, which of course are inoperable when the electrical system of the vehicle is submerged. The required tempered safety glass of motor vehicle windshields and windows is extremely resistant to breakage by a blunt impact force, and cannot be readily kicked out to allow escape. A reasonably fast or heavy impact with a pointed or edged object is necessary to cause the glass to shatter.

As a result, a number of handheld tools and devices for breaking the glass in an automobile window or the like have been developed in the past. The problem with all such devices is that they must be manually operated by the person(s) trapped in the vehicle. If for some reason the trapped person is unable to use the glass-breaking tool (e.g., due to injury or loss of consciousness), he or she remains trapped within the submerged vehicle to drown unless rescue from outside the vehicle occurs in short order.

Thus, a glass-breaker mechanism solving the aforementioned problems is desired.

SUMMARY OF THE INVENTION

The glass-breaker mechanism includes a sensor component and a glass-breaking component. The sensor component is installed within the door or other suitable structure of the vehicle, and includes a water-soluble substance (e.g., bicarbonate of soda, etc.) that retains a spring in compression when the substance is dry. When the water-soluble material dissolves, the spring is released and drives a pin into a gas cartridge to release a pressurized gas (e.g., carbon dioxide, $CO_2$) stored within the cartridge.

The gas is transmitted under pressure through a flexible tube or hose to the glass-breaking component, which is secured to the lowermost portion of the window glass below the top of the door or other body panel. A spiked piston is disposed within the glass-breaking component, and is driven outward from its housing by the gas pressure against the glass with enough force to shatter the glass. As motor vehicle glass is required to be tempered safety glass, the glass is shattered into myriad small pieces that are held together by the plastic safety laminate. A person trapped within the vehicle may then easily break out the shattered glass to escape from the submerged vehicle.

In one embodiment, the sensor device or component is immovably affixed in the lower portion of a vehicle door. Any immersion of the lower portion of the vehicle in water will immerse the sensor device, thus triggering the breaker mechanism to allow vehicle occupants to escape. Alternatively, the sensor device may be installed upon a generally vertical guide (e.g., a rod or tube, etc.) within the door. The sensor device will normally rest in the bottom of the door, but if the vehicle were to turn over, the sensor device would slide to what would normally be the top of the door, thus reducing the depth of water required to trigger the sensor unit. At least one such system may be installed within the driver's door of the vehicle, but preferably at least two such systems are installed, one on each side of the vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The glass-breaker mechanism is an automated device that requires no action whatsoever on the part of the user. The device may be used to break a glass panel or the like automatically in virtually any environment or installation when activated by water, but is particularly well suited for installation within the door or other body panel of a motor vehicle. Typically, the glass-breaker component is secured to the lower portion of the window glass below the upper edge of the door or panel, i.e., to a portion of the window that is still inside the door when the window is fully closed.

Figure 1:
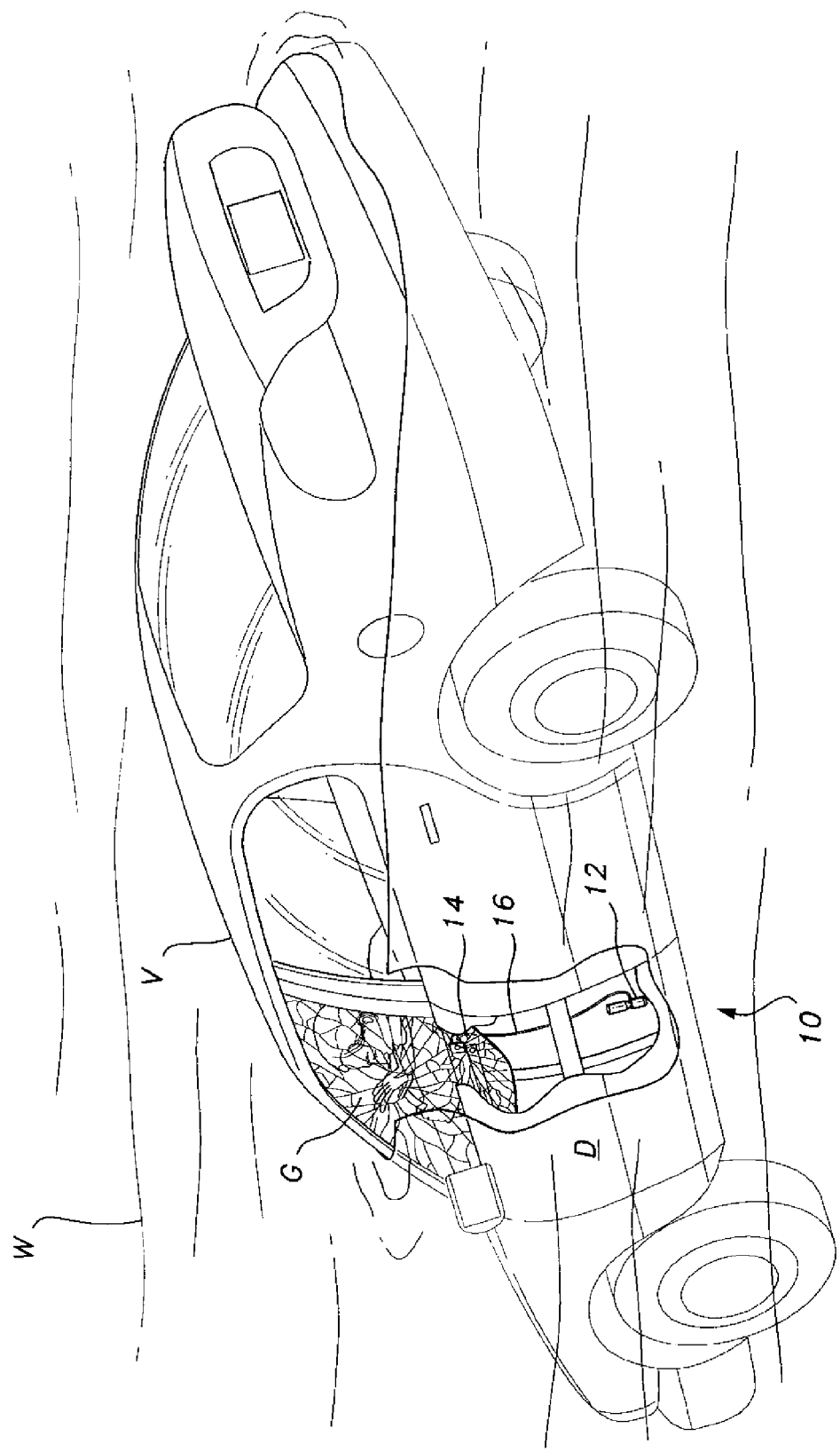
FIG. 1 is an environmental, perspective view of a submerged vehicle having a glass-breaker mechanism according to the present invention installed therein, illustrating its operation.
Figure 2:
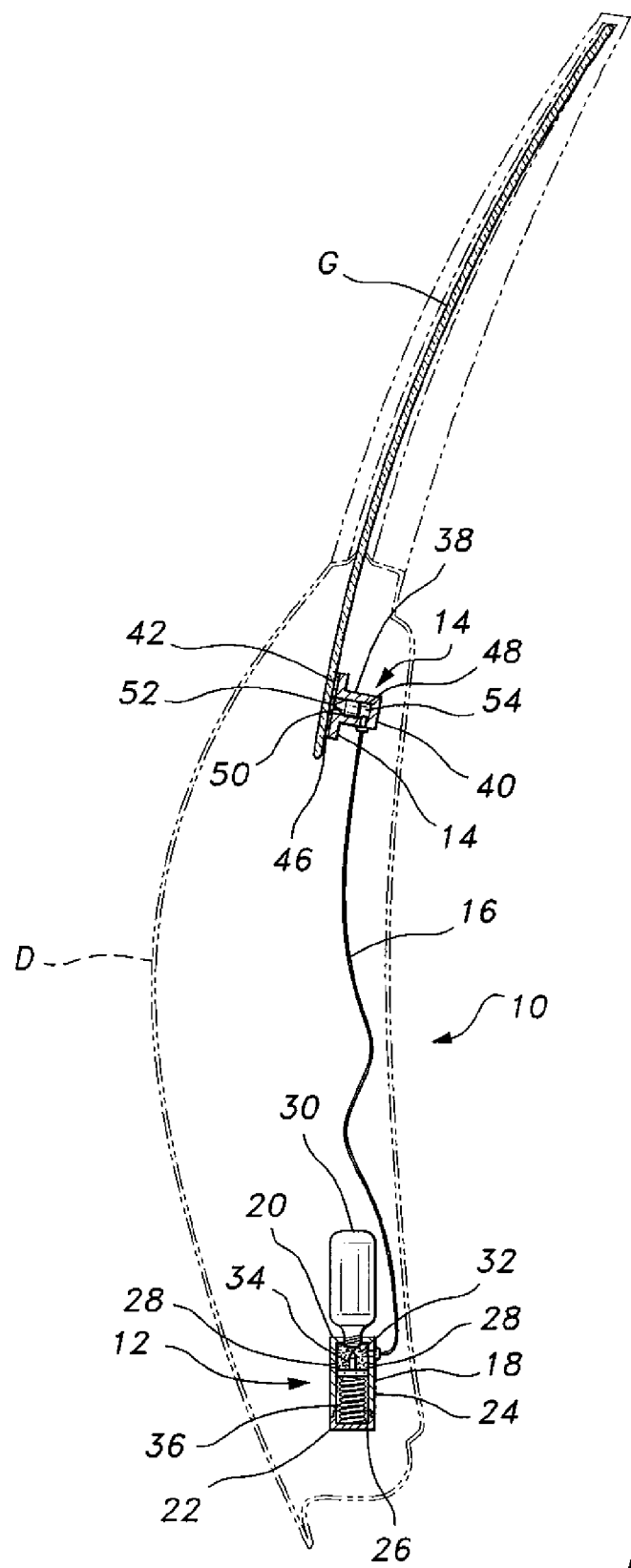
FIG. 2 is an environmental elevation view in section of the components of the glass-breaker mechanism of FIG. 1, showing an exemplary installation within the door of a motor vehicle.
Figure 3:
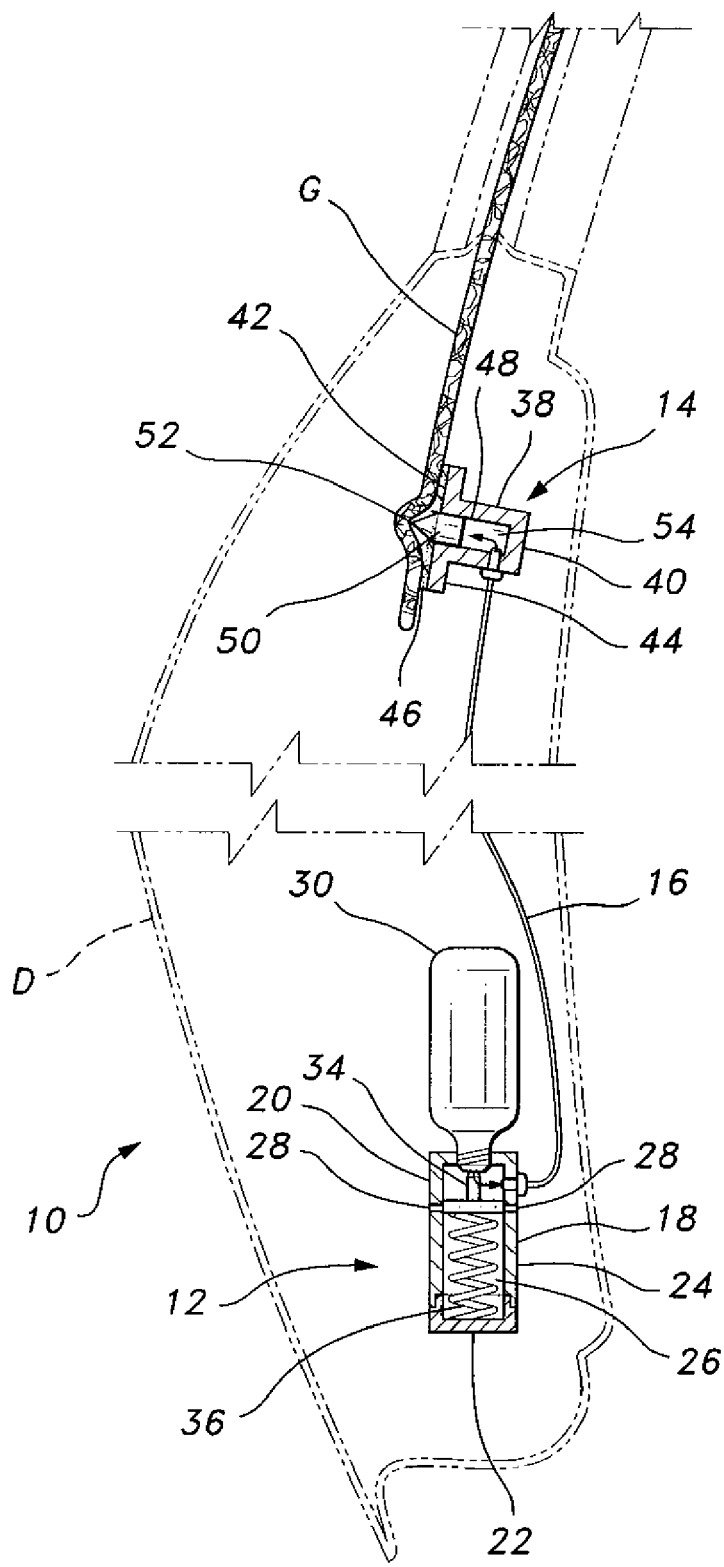
FIG. 3 is a partial environmental elevation view in section similar to FIG. 2, but illustrating the system after actuation by immersion in water.

FIG. 1 of the drawings is an environmental perspective view of a first embodiment of the glass-breaker mechanism 10, and FIGS. 2 and 3 illustrate the mechanism 10 in its armed state and in its activated state, respectively. In FIG. 1, a motor vehicle V is immersed in a body of water W. The mechanism 10 has been activated by water entering the sensor unit 12 installed within the door D of the vehicle V. As a result, the glass-breaker unit 14 has shattered the window glass G of the vehicle V to allow the occupant to escape. All glass panels in motor vehicles are required by law to be made of tempered safety glass. Such glass is highly resistant to breakage when hit by a blunt object, but will shatter into myriad small pieces when broken by a sharp impact by a pointed object. The small pieces of glass are only held together by the plastic laminate between the two panes, allowing the glass to be broken away easily for escape.

FIGS. 2 and 3 respectively illustrate the glass-breaker mechanism 10 in its armed and activated conditions. The mechanism 10 includes a sensor unit 12 and glass-breaker unit 14. The two units 12 and 14 communicate pneumatically by a flexible pneumatic tube or hose 16 connecting the two components. The sensor unit 12 comprises a sensor body 18 having opposite first and second ends 20 and 22 and a wall 24 extending between the two ends 20, 22. The first and second ends 20, 22 and the wall 24 of the sensor body 18 define an interior chamber 26. At least one water passage 28 (and preferably a plurality of such passages) extends through the wall 24 to allow water to flow into the interior chamber 26 when the sensor unit 12 is submerged.

A pressurized gas cartridge 30 (e.g., a $CO_2$ cartridge) extends from the first end 20 of the sensor body 18. The neck of the cartridge 30 extends into the interior chamber 26, and defines a mouth closed by a penetrable seal. A water-soluble material 32 (e.g., bicarbonate of soda, etc.) is placed within the interior chamber 26, adjacent the first end 20 of the sensor body 18. A cartridge-penetrating pin 34 is installed within the interior chamber 26, and is oriented toward the penetrable seal of the pressurized gas cartridge 30. A compression spring 36 is installed within the interior chamber 26 adjacent the second end 22 of the sensor body 18, and is biased to urge the pin 34 toward the gas cartridge 30. However, the pin 34 is restricted from penetrating the end of the cartridge 30 by the water-soluble material 32, which is located within the interior chamber 26 between the pin 34 and the first end 20 of the sensor body 18. Thus, the pressurized gas cartridge 30 cannot be punctured to allow the gas to escape to the glass-breaking unit or component 14 unless and until the water-soluble material is dissolved and/or washed from the interior chamber 26 of the sensor body 18.

The glass-breaker unit 14 has a housing or body 38 having a closed first end 40 and an open second end 42. The second end 42 preferably has a relatively large flange 44 extending therefrom for securing (e.g., glass adhesive 46, etc.) the housing 38 to the glass G. The body 38 defines an interior chamber 48 extending between the first and second ends 40 and 42. A glass-breaker spike 50 is slidably disposed within the interior chamber 48. The spike 50 has a sharpened or pointed edge or end 52 oriented toward the open second end 42 of the glass-breaker body 38. The diameter of the spike 50 fills the internal diameter of the interior chamber 48. The glass-breaker body 38 and its closed first end 40, along with the spike 50, define a pneumatic chamber 54 therein.

The mechanism 10 operates completely automatically whenever the sensor unit 12 is submerged in water. While the mechanism 10 may be used as an automated, water-activated glass-breaking device in virtually any environment, it is particularly well suited for installation in a motor vehicle. FIGS. 2 and 3 illustrate the mechanism 10 in an exemplary installation within a motor vehicle door D. The glass-breaker component 14 is adhesively attached to the window glass G along the lowermost portion thereof, i.e., that portion that remains below the windowsill of the door D when the window glass G is all the way up. In FIG. 2, the system is armed, but has not been activated. The water-soluble material 32 remains in its solid state, thereby holding the spring 36 and the cartridge-penetrating pin 34 away from the penetrable seal or nozzle of the pressurized gas cartridge 30. As the cartridge 30 remains sealed, no pressurized gas can escape through the flexible hose or tube 16 to the glass-breaker unit or component 14 to propel the glass-breaking spike 52 into the window glass G, and the glass remains unbroken.

FIG. 3 provides a detailed illustration of the result of immersion in water of the sensor unit or component 12, as would occur in the circumstances depicted in FIG. 1 of the drawings. In FIG. 3, water has entered the interior chamber 26 of the sensor body 24 through the water passages 28, dissolving and washing away the water-soluble material previously contained therein and illustrated in FIG. 2. This allows the spring 36 to push the pin 34 into the penetrable seal or nozzle of the pressurized gas cartridge 30, puncturing the seal and allowing the gas ($CO_2$, etc.) to escape. The pressurized gas passes into the flexible pneumatic line 16 and travels to the glass-breaking component 14.

The pressurized gas enters the pneumatic chamber 54 of the glass-breaker body 38, thereby forcing the glass-breaker spike 50 outward toward the open second end 42 of the glass-breaker unit 14, i.e., toward the window glass G to which the glass-breaker unit 14 is attached. As the glass-breaker spike 50 is propelled into the glass G, the sharpened tip or edge 52 of the spike 50 contacts the glass G, causing the glass to break. As all motor vehicle glass is required to be tempered safety glass, the glass breaks into myriad small particles, held together only by the plastic safety core sandwiched between the two glass sheets. A person within the motor vehicle can then easily break out the shattered glass without undue force or risk of injury.

While the present automated glass-breaker mechanism 10 is intended to be a permanently installed component in a motor vehicle, it will be seen that the various components may be reused if the disposable materials of the sensor unit 12 are replaced after use. It will be seen that the second end 22 of the sensor unit 12 may have a removable cap (e.g., a threaded cap) that may be removed and replaced as desired. Also, the pressurized gas cartridge 30 may be removed from the opposite first end 20 of the sensor unit 14. Accordingly, the depleted cartridge 30 is replaced with a fresh, fully charged cartridge, and the cap at the second end 22 of the sensor unit 14 is removed to access the interior chamber 26 of the sensor unit 12. The spring 36 and the pin 34 are removed, and a fresh charge of water-soluble material is placed within the first end 20 of the sensor unit 12. The pin 34 and the spring 36 are then replaced in proper order, and the cap at the second end 22 is replaced to ready the sensor unit 12 for reuse. The glass-breaker unit 14 may be removed from the shattered glass to which it was attached, and the glass-breaker spike 50 is pushed back toward the closed first end 40 of the glass-breaker body 38. The glass-breaker unit 14 may then be reinstalled to an unbroken sheet of glass G for reuse as necessary.

Figure 4:
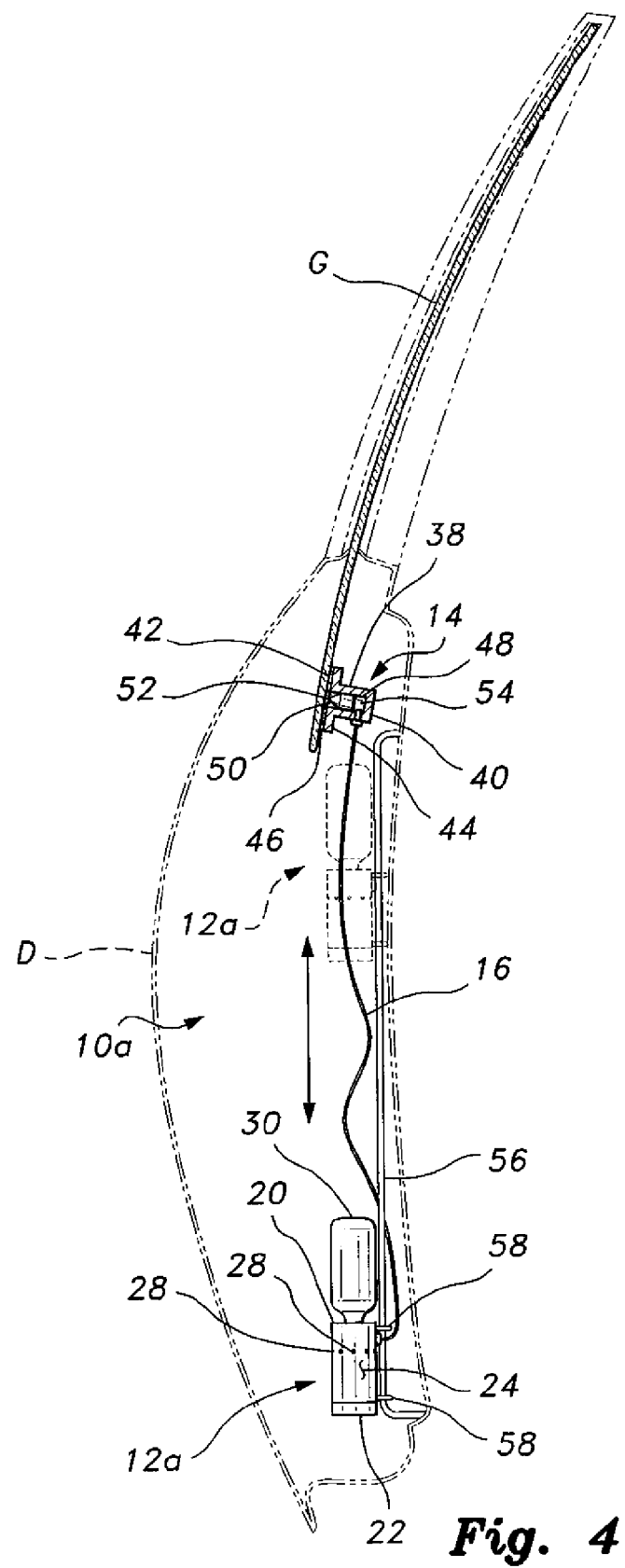
FIG. 4 is an environmental elevation view in section of an alternative embodiment of a glass-breaker mechanism according to the present invention, wherein the sensor component is installed on a rod within the vehicle door, the sensor being slidable along the rod in the event of vehicle rollover.

FIG. 4 illustrates an alternative embodiment of the glass-breaker mechanism, designated generally as mechanism 10a, wherein the sensor unit 12a can travel vertically within the vehicle door D. A guide 56 (e.g., a rod, or alternatively, a tube, a track, a channel, etc.) is installed generally vertically within the door D. The sensor unit 12a includes a pair of loops 58 extending laterally therefrom. The loops 58 pass around the guide 56 to secure the sensor unit 12a slidably along the guide. Other means may be used to secure the sensor unit to the guide, depending upon the specific configuration of the guide.

In this embodiment, the sensor unit 12a will always seek the lowest point along the guide 56. In the event that the motor vehicle is immersed in water in the general orientation illustrated in FIG. 1, the sensor unit will remain near the bottom of the door D, thus providing actuation of the mechanism 10a shortly after water rises above the lowest portion of the door.

However, in the event that the motor vehicle comes to rest inverted in a body of water, the sensor unit 12a will slide along the rod to a position adjacent the windowsill of the door, thus providing activation even if the lower half of the motor vehicle remains clear of the water.

Although the glass-breaker mechanism is shown and described herein as being installed within the driver side door of a motor vehicle, the mechanism may be installed in any practicable location within the vehicle, as desired. For example, the sensor unit may be installed in some fixed structure of the vehicle, e.g., a front or rear fender, etc., the sensor communicating pneumatically with the glass-breaker unit installed upon a fixed or movable window panel through the pneumatic tube. Also, although only a single mechanism is illustrated herein in each of the drawings, it will be seen that multiple mechanisms may be installed in any given vehicle, e.g., one in each door, rear hatch, tailgate, and/or fixed window or windshield panel, if desired.

It is to be understood that the present invention is not limited to the embodiments described above, but encompasses any and all embodiments within the scope of the following claims.

We claim:

1. A glass-breaker mechanism for installation within a door of a motor vehicle, comprising:
    a water-activated sensor; and
    a glass breaker connected to the sensor, the glass breaker being selectively actuated by the sensor, wherein the sensor and the glass breaker are adapted for installation within a door of a motor vehicle, the mechanism further including a generally vertical guide adapted for installation within the door of the vehicle, the sensor being retained by and slidable on the guide when the vehicle is overturned.

2. The glass-breaker mechanism according to claim 1, wherein the sensor comprises:
    a sensor body having a first end, a second end opposite the first end, and a wall defining an interior chamber between the first end and the second end, the wall having at least one passage extending therethrough;
    a cartridge of pressurized gas extending from the first end of the sensor body, the cartridge selectively communicating pneumatically with the interior chamber of the sensor body;
    a water-soluble material disposed within the interior chamber of the sensor body adjacent the first end thereof;
    a cartridge-penetrating pin disposed within the interior chamber of the sensor body, the water-soluble material being disposed between the pin and the first end of the sensor body;
    a spring disposed within the interior chamber of the sensor body adjacent the second end thereof, the spring biasing the pin toward the cartridge; and
    a flexible pneumatic tube extending from the interior chamber of the sensor body to the glass breaker.

3. The glass-breaker mechanism according to claim 1, wherein the glass breaker comprises:
    a glass-breaker body having a first end, a second end opposite the first end, and an interior chamber therebetween, the second end being open and adapted for attachment to a sheet of glass;
    a glass-breaker spike disposed within the interior chamber of the glass-breaker body, the spike having a sharpened end oriented toward the open second end of the glass-breaker body, the spike and the first end of the glass-breaker body defining a pneumatic chamber therein; and
    a flexible pneumatic tube extending between the pneumatic chamber of the glass-breaker body and the sensor.

4. The glass-breaker mechanism according to claim 1, further including a cartridge of pressurized gas replaceably installed on the sensor and communicating pneumatically therewith.

5. The glass-breaker mechanism according to claim 1, wherein the sensor defines an interior chamber having a water-soluble material replaceably disposed therein.

6. The glass-breaker mechanism according to claim 1 wherein the mechanism is adapted for installation within the door of a motor vehicle, the door further having a glass window installed therein, the glass breaker being adapted for adhesive attachment to the glass window.

7. A glass-breaker mechanism, comprising:
    a sensor body having a first end, a second end opposite the first end, and a wall defining an interior chamber between the first end and the second end, the wall having at least one passage extending therethrough;
    a cartridge of pressurized gas extending from the first end of the sensor body, the cartridge selectively communicating pneumatically with the interior chamber of the sensor body;
    a water-soluble material disposed within the interior chamber of the sensor body adjacent the first end thereof;
    a cartridge-penetrating pin disposed within the interior chamber of the sensor body, the water-soluble material being disposed between the pin and the first end of the sensor body;
    a spring disposed within the interior chamber of the sensor body adjacent the second end thereof, the spring biasing the pin toward the cartridge; and
    a glass breaker communicating pneumatically with the interior chamber of the sensor body, the glass breaker being selectively actuated by the sensor body.

8. The glass-breaker mechanism according to claim 7, wherein the glass breaker comprises:
    a glass-breaker body having a first end, a second end opposite the first end, and an interior chamber therebetween, the second end being open and adapted for attachment to a sheet of glass;
    a glass-breaker spike disposed within the interior chamber of the glass-breaker body, the spike having a sharpened end oriented toward the open second end of the glass-breaker body, the spike and the first end of the glass-breaker body defining a pneumatic chamber therein; and
    a flexible pneumatic tube extending between the pneumatic chamber of the glass-breaker body and the interior chamber of the sensor body.

9. The glass-breaker mechanism according to claim 7 wherein the sensor body and the glass breaker are adapted for installation within a door of a motor vehicle, the mechanism further including a generally vertical guide adapted for installation in the door of the vehicle, the sensor body being retained by and slidable upon the guide when the vehicle is overturned.

10. The glass-breaker mechanism according to claim 7, wherein the cartridge is replaceably secured to the sensor body.

11. The glass-breaker mechanism according to claim 7, further including a cap removably attached to the second end of the sensor body so that the water-soluble material is replaceable.

12. The glass-breaker mechanism according to claim 7 wherein the sensor body and the glass breaker are adapted for installation within a door of a motor vehicle, the door having a glass window installed therein, the glass breaker being adapted for adhesive attachment to the glass window.

13. A glass-breaker mechanism, comprising:

a glass-breaker body having a first end, a second end opposite the first end, and an interior chamber therebetween, the second end being open and adapted for attachment to a sheet of glass;

a glass-breaker spike disposed within the interior chamber of the glass-breaker body, the spike having a sharpened end oriented toward the open second end of the glass-breaker body, the spike and the first end of the glass-breaker body defining a pneumatic chamber therein; and a water-activated sensor;

a pneumatic tube extending between the sensor and the pneumatic chamber;

a pressurized gas cartridge attached to the sensor, the cartridge releasing gas under pressure through the pneumatic tube when water enters the sensor to force the spike against the glass to shatter the glass.

14. The glass-breaker mechanism according to claim 13, wherein the sensor comprises:

a sensor body having a first end, a second end opposite the first end, and a wall defining an interior chamber between the first end and the second end, the wall having at least one passage extending therethrough;

a water-soluble material disposed within the interior chamber of the sensor body adjacent the first end thereof;

a cartridge-penetrating pin disposed within the interior chamber of the sensor body, the water-soluble material being disposed between the pin and the first end of the sensor body; and a spring disposed within the interior chamber of the sensor body adjacent the second end thereof, the spring biasing the pin toward the cartridge;

wherein the water-soluble material dissolves when sufficient water enters through the passage, releasing the cartridge-penetrating pin to pierce the gas cartridge and release gas into the pneumatic tube.

15. The glass-breaker mechanism according to claim 13 wherein the glass-breaker body, the sensor, the cartridge, and the pneumatic tube are adapted for installation within a door of a motor vehicle, the mechanism further including a generally vertical guide adapted for installation within the door of the vehicle, the sensor being retained by and slidable upon the guide when the vehicle is overturned.

16. The glass-breaker mechanism according to claim 13, wherein the cartridge of pressurized gas is replaceably attached to the sensor.

17. The glass-breaker mechanism according to claim 13, wherein the sensor defines an interior chamber having a water-soluble material replaceably disposed therein.

18. The glass-breaker mechanism according to claim 13 wherein the mechanism is adapted for installation within a door of a motor vehicle, the door having a glass window installed therein, the glass-breaker body being adapted for adhesive attachment to the glass window.

* * * * *